United States Patent

[11] 3,629,898

[72] Inventor John J. Plisky
 Munster, Ind.
[21] Appl. No. 41,802
[22] Filed June 1, 1970
[45] Patented Dec. 28, 1971
[73] Assignee The Anderson Company

[54] WINDSHIELD WIPER ASSEMBLY
 2 Claims, 5 Drawing Figs.
[52] U.S. Cl. ..................................................... 15/250.42
[51] Int. Cl. ....................................................... A47l 1/00,
 B60s 1/02
[50] Field of Search........................................... 15/250.31,
 250.32, 250.36, 250.42

[56] References Cited
 UNITED STATES PATENTS
 2,948,011 8/1960 Krohm .......................... 15/250.42
 3,103,687 9/1963 Golub et al. ................... 15/250.42
 3,108,308 10/1963 Oishei .......................... 15/250.42
 3,414,931 12/1968 Kodama ....................... 15/250.42

Primary Examiner—Peter Feldman
Attorney—F. W. Rose

ABSTRACT: This invention relates to windshield wiper assemblies which include a wiping element and a pressure-distributing superstructure operatively connected together so as to transmit and distribute the pressure received by the pressure-distributing superstructure from the wiper arm to spaced locations along the length of the wiping element. The pressure-distributing superstructure comprises at least one lower member having an inverted V-shaped cross section and an upper member also having an inverted V-shaped cross section. The upper member is pivotally connected to the lower member by a pair of inturned tabs seated in a pair of notches in the lower member and has round embossments adjacent the inboard ends of the inturned tabs on each side of the underside thereof, which embossments engage the upper surface of the lower member when the lower member rocks with respect to the upper member.

PATENTED DEC 28 1971  3,629,898

INVENTOR.
JOHN J. PLISKY
BY
F.W. ROSE
ATTORNEY

WINDSHIELD WIPER ASSEMBLY

BACKGROUND OF THE INVENTION

1. Field of the Invention

This invention relates to the improvements in the pressure-distributing superstructure of windshield wiper assemblies of the type which comprises at least one lower member having an inverted V-shaped cross section and an upper member having an inverted V-shaped cross section which is rockably connected to the lower member by a pair of inturned tabs seated in a pair of notches in the lower member.

2. Description of the Prior Art

Since the introduction in the 1940's of windshield wiper assemblies of the type generally shown in the John W. Anderson U.S. Pat. No. 2,596,063, such windshield wiper assemblies and variations thereof have been generally used throughout the automotive industry. These windshield wiper assemblies typically included a wiping element and a superstructure which was slidably attached to the wiping element and which consisted of articulated parts so that pressure received from the wiper arm was transmitted through the superstructure to spaced locations along the wiping element for conformance to the windshield to be wiped. The wiping element consisted of a resiliently flexible backing strip or support member, typically made of metal, and a resilient wiping member, typically made of rubber, which had a lowermost portion or lip adapted to wipe a windshield.

One successful variation of such windshield wiper assemblies has been one in which the superstructure is made of articulated parts of members which have inverted V-shaped cross sections, the upper member of the superstructure being rockably connected to a lower member by a pair of inturned tabs seated in a pair of notches in the lower member. As modern automobile manufacturers demanded longer and longer blades, the precision of the fit between the two members at the rockable connection became more and more important. When the two members do not fit together at the rockable connection with considerable precision, the two members rattle against each other to produce undesirable noise, the layover or tilt of the wiping element is not adequately controlled with resultant poor wiping and undesired movement of the two members in relation with each other produces wear.

SUMMARY OF THE INVENTION

A windshield wiper blade assembly of the type with which the invention is concerned comprises a wiping element and a pressure-distributing superstructure adapted to receive pressure from an arm and distribute the pressure to spaced locations on the wiping element, which pressure-distributing superstructure comprises at least one lower member having an inverted V-shaped cross section and an upper member having an inverted V-shaped cross section rockably connected to the lower member by a pair of inturned tabs seated in a pair of notches in the bottom edge of the lower member. In accordance with the invention, the upper member is provided with bearing means on both sides of the underside thereof adjacent the inboard ends of the inturned tabs which bearing means engage the upper surface of the lower member when the lower member rocks with respect to the upper member.

The above construction provides a close fit between the two members at the rockable connection irrespective of the angular relation of the two members (i.e., whether the two members are in their relaxed position or have been rocked a considerable amount with respect to each other). As explained more fully below, such closeness of fit results in a low level of noise at the connection, increased control of layover and reduced wear. It also results in a product which behaves in a more uniform manner in spite of variations in manufacture.

BRIEF DESCRIPTION OF THE DRAWINGS.

The details of construction and operation of the invention are more fully described with reference to the accompanying drawings which form a part hereof and in which like reference numerals refer to like parts throughout. In the drawings.

DESCRIPTION OF THE PREFERRED EMBODIMENT

Figure 1:
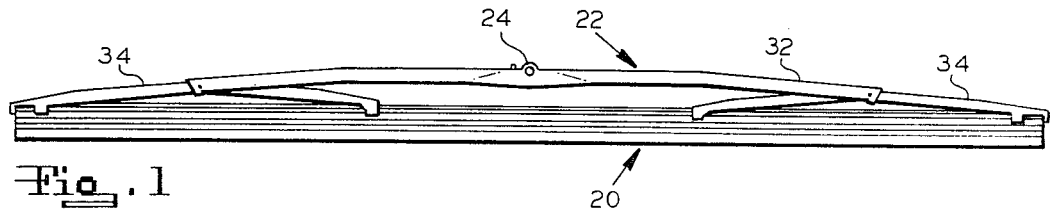
FIG. 1 is a side view of a windshield wiper assembly illustrating an embodiment of the invention.

The windshield wiper assembly shown in FIG. 1 comprises a wiping element indicated generally at 20 and an articulated pressure-distributing means or superstructure, indicated generally at 22, which receives pressure from a wiper arm (not shown but attachable at 24) and then distributes (i.e., transmits and proportions) such pressure to a plurality of positions, spaced locations or longitudinal points along the length of wiping element 20. Wiping element 20 is conformable to both flat and curved surfaces and, when urged toward a windshield by the pressure-distributing superstructure 22, automatically follows surfaces of varying curvatures such as those involved in wiping curved windshields.

Figure 2:
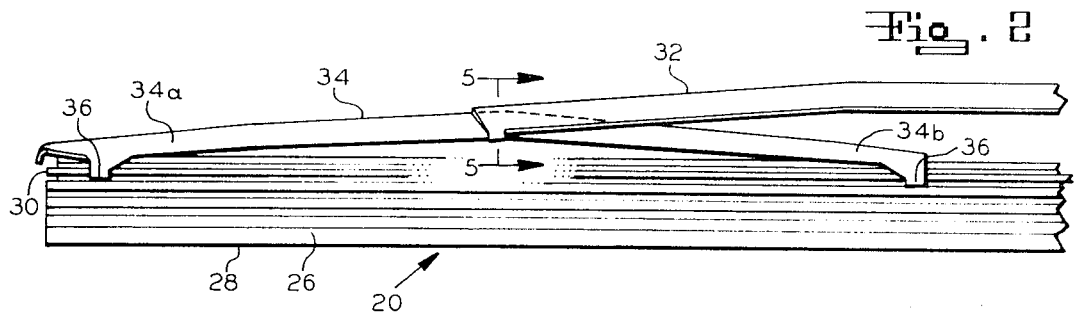
FIG. 2 is an enlarged side view of a portion of the windshield wiper assembly of FIG. 1.

Wiping element 20 comprises a resilient wiping member or squeegee 26 which may be made of rubber or other elastomeric material and which has a lowermost or bottom portion which has a wiping edge or lip 28 and a flexible support member or flexor 30 made of resiliently flexible material, such as metal or plastic of suitable thickness (see FIG. 2). Flexor 30 maintained in association with the resilient wiping member 26 by various constructions known to the art, such as by retaining it in longitudinal grooves in the resilient wiping member 26.

The pressure-distributing superstructure 22, shown in FIG. 1, comprises a primary or upper member, bridge or yoke 32 which is rockably connected at its ends to secondary or lower members, bridges or yokes 34 at the ends of each of which are claws 36 or other equivalent structures or arrangements which transmit pressure to spaced locations on wiping element 20 and keep the articulated pressure-distributing superstructure 22 in operative association with blade element 20. At least some of the claws slide with respect to blade element 20 so that it can bow or flex without restriction by the pressure-distributing superstructure as it moves across various parts of the windshield. Various means known to the art may be used to prevent the pressure-distributing superstructure 22 from being longitudinally moved or slit off the wiping element in either direction. Those skilled in the art will understand that various arrangements of pressure-distributing superstructures other than that shown in FIG. 1 may be used in accordance with the invention. Such arm-pressure-distributing superstructures characteristically transmit the arm pressure to the wiping element adjacent the ends of the wiping element and at least one intermediate location spaced along its length and comprise elongate members rockably connected together to form an articulated structure whose members move relative to each other generally in a plane perpendicular to the surface to be wiped. The windshield wiper assembly may be constructed so that the wiping element 20 can be replaced, an appropriate construction being shown in U.S. Pat. No. 2,897,530, issued Aug. 4, 1959, to John W. Anderson.

Figure 3:
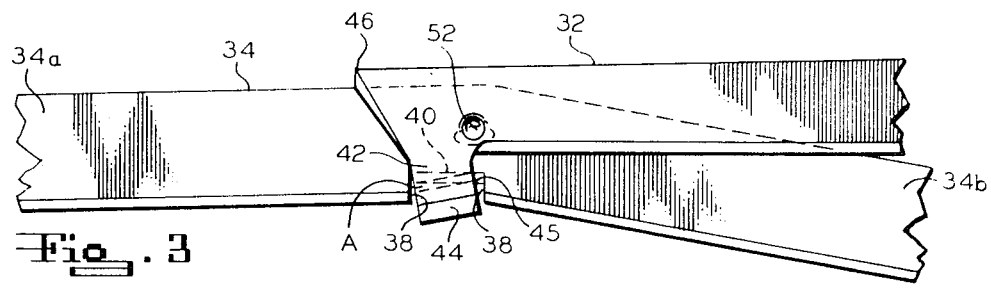
FIG. 3 is a greatly enlarged side view of the connection of the upper member to a lower member of the pressure-distributing superstructure of the windshield wiper assembly of FIGS. 1 and 2.

Upper member 32 and lower members 34 are advantageously constructed so they have generally inverted V-shaped cross sections (see FIG. 5) over most of their lengths. Lower member 34 is arched, that is, the outboard portion 34a and the inboard portion 34b are inclined downwardly from the midpoint of member 34 (see FIG. 2). Accordingly, there is space between the inboard portion 34b of the lower member 34 and the underside of the end of upper member 32 so that, when the blade element is flexed upwardly when wiping a curved portion of the windshield, the inboard portion 34b of the lower member can pivot upwardly and nest within the corresponding portion of the upper member 32 (see FIG. 4). A pivotal connection between members 32 and 34 is effected by notching the lower member on each side of its bottom edges, sides of the notch being shown at 38 in FIGS. 3 and 4 and the top of the notch indicated by 40 in these FIGS. Both sides of the upper member 32 have downwardly depending projections or legs 42 which are bent to form inturned fingers or tabs 44 which seat in the notches in the bottom edges of the lower member 34. The planes of the inturned tabs 44 are inclined at a small angle A outwardly with respect to the tops 40 of the notches when the windshield wiper blade assembly is in a straight position (such as that shown in FIGS. 1 and 2) so that the tabs can pivot or rock upwardly about their top inboard edges 45 which are in contact with the tops 40 of the notches in the lower member close to the inboard ends of these notches. When the windshield wiper assembly is in a straight position or in a relaxed position (i.e., with the wiping element flexed slightly outwardly, such as shown in FIG. 3), the lower surfaces 48 of the outer end or tip 46 of the upper member rest on or are in close proximity to the upper surfaces 50 of the outboard portion 34a of member 34 and members 32 and 34 are held together with little, if any, looseness.

Figure 4:
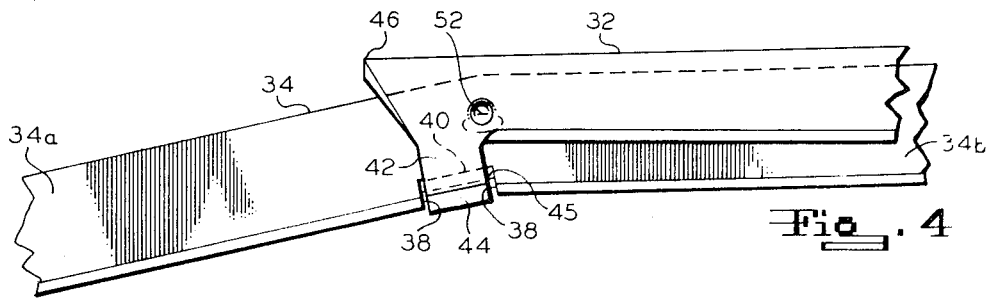
FIG. 4 is a view similar to FIG. 3 but showing the upper and lower members in different angular relation.

When the windshield wiper assembly is flexed to wipe a curved section of the windshield as shown in FIG. 4, the inboard portion 34b of the lower member 34 pivots upwardly toward member 32 so that these members tend to become parallel (see FIG. 4). This causes the lower surfaces 48 of the tip 46 of the upper member 32 to move away from the upper surfaces of the outboard portion 34a and to "open up" with respect to the upper surfaces 50 of the lower member 34 and develop clearances or looseness between these surfaces as shown in FIG. 4.

Figure 5:
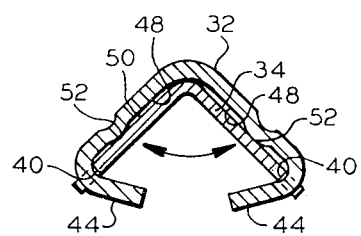
FIG. 5 is a greatly enlarged cross-sectional view taken along the lines 5—5 of FIG. 2.

Because of this looseness, which may be increased by inevitable variations in manufacturing, the upper member can rock sideways with respect to the lower member as shown by the arrows in FIG. 5, resulting in noise, wear, improper layover and chatter of the windshield wiper assembly.

In accordance with the invention, protuberances such as the round embossments 52 are formed on both sides of the lower surfaces of the upper member adjacent the inboard edges 45 of the inturned tabs. Protuberances 52 act as spacing or bearing means in that when the upper and the lower member pivot or rock with respect to each other, the top surfaces of the sides of the lower member move over or roll on the round domes of the embossments with the result that any clearance or looseness is held to a minimum.

It will, of course, be understood that various details of construction may be varied without departing from the principles of this invention, and it is, therefore, not the purpose to limit the patent granted herein otherwise than necessitated by the scope of the appended claims.

I claim:
1. A windshield wiper blade assembly comprising a wiping element and a pressure-distributing superstructure adapted to receive pressure from an arm and distribute the pressure to spaced locations on the wiping element, said pressure-distributing superstructure comprising at least one lower member having an inverted V-shaped cross section and an upper member having an inverted V-shaped cross section, the upper member being rockably connected to the lower member by a pair of inturned tabs seated in a pair of notches in the lower member, said upper member having bearing means on both sides of the underside thereof, said bearing means being a pair of projections positioned adjacent the inboard ends of the inturned tabs and engaging the upper surface of the lower member when the lower member rocks with respect to the upper member.

2. A windshield wiper blade assembly comprising a wiping element and an articulated pressure-distributing superstructure adapted to receive pressure from an arm and distribute the pressure to spaced locations on the wiping element, said pressure-distributing superstructure comprising two lower members having inverted V-shaped cross sections and an upper member having an inverted V-shaped cross section rockably connected at its ends to each of the the lower members by a pair of inturned tabs seated in a pair of notches in the bottom edges of the lower member, said tabs being positioned so that, in a relaxed condition of the wiper blade assembly, they are inclined to the edges of notches at small acute angles with the inboard top edge of each tab and the top of each notch in contact close to the inboard end of the notch, said upper member having adjacent each end a round embossment on each side of the underside thereof which embossments are positioned adjacent the inboard ends of the inturned tabs and engage the upper surfaces of the lower members when the lower members rock with respect to the upper member.

* * * * *